Dec. 20, 1966  A. B. BRANDLER ET AL  3,293,497
GROUND FAULT DETECTOR
Filed April 3, 1962  2 Sheets-Sheet 2
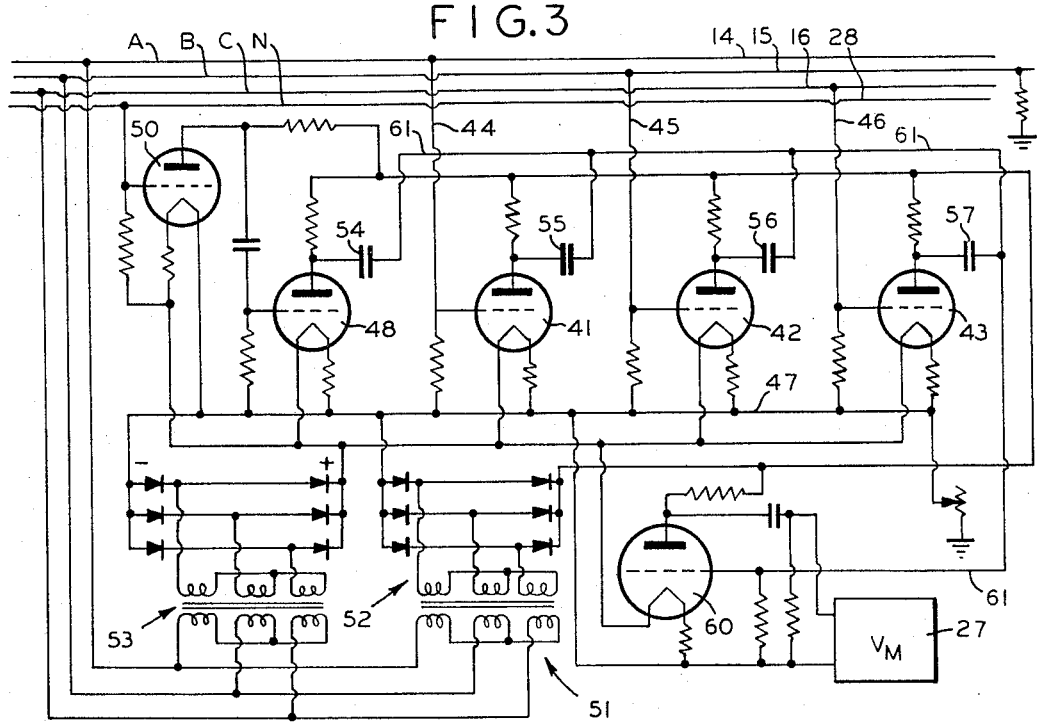
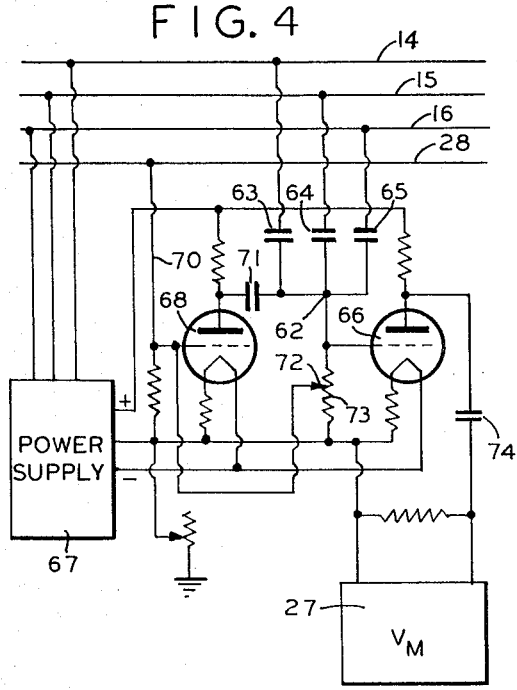
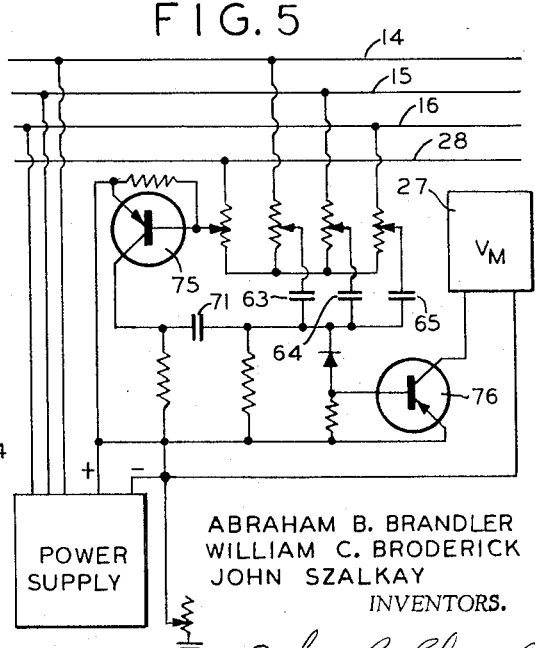
ABRAHAM B. BRANDLER
WILLIAM C. BRODERICK
JOHN SZALKAY
    INVENTORS.
BY John P. Chandler
    their ATTORNEY.

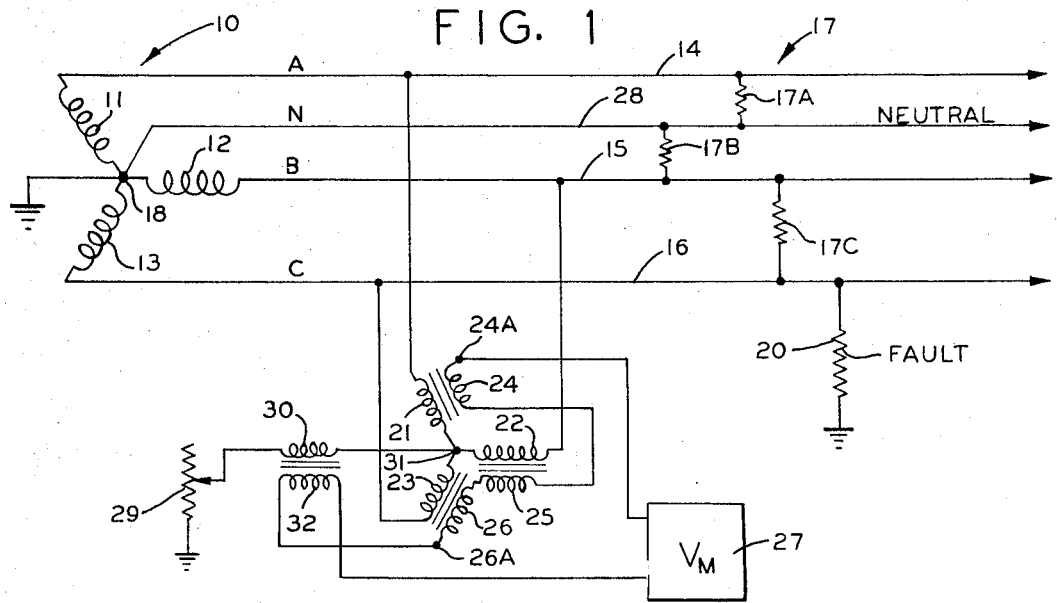
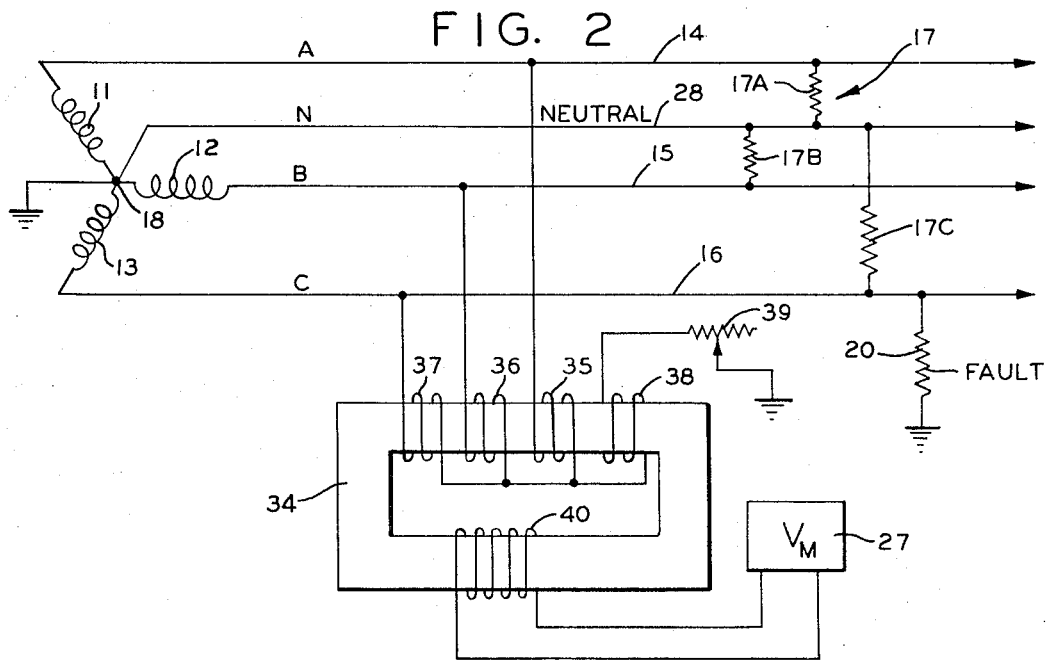

United States Patent Office 3,293,497
Patented Dec. 20, 1966

3,293,497
GROUND FAULT DETECTOR
Abraham B. Brandler, 835 Ocean Ave., Brooklyn, N.Y. 11235, William C. Broderick, 219 Concord Drive, River Edge, N.J. 07661, and John Szalkay, 84—24 96th St., Woodhaven, Queens, N.Y. 11421
Filed Apr. 3, 1962, Ser. No. 184,809
9 Claims. (Cl. 317—18)

This invention relates to a fault detector for determining a leakage fault in grounded systems between one of the phase conductors in a multi-phase power system and ground. The invention has particular reference to a circuit which measures the phase voltages present on the conductors, adds the voltages to produce a vector sum, and then determines the value of the unbalanced voltage.

Many attempts have been made to sense a ground fault by means of current measurements on all the phases of a multi-phase power system. Such an arrangement is generally inconvenient because the currents are difficult to measure without opening up the conductors which carry the power. Current transformers have often proved difficult to translate the current vector sum into a quantity which represents a fault condition or because the measuring devices are bulky and do not always measure all of the fault current. Ground fault detectors can be used with grounded or ungrounded systems having one point in the system connected to ground or to a conductive container or enclosure. When another point in the system is then grounded by failure of insulation or for any other reason, a possibly dangerous fault current results. It is this fault that the present invention detects and further produces information regarding the system's condition.

The present invention relates only to voltage measurements between all the phases and, when there is a ground return, the vector sum of the voltages including the voltage between the neutral conductor and a common reference point. The sum of these voltages is obtained by vector addition and the unbalance voltage remaining indicates the extent of the fault or leakage current.

One of the objects of this invention is to provide an improved fault detector which avoids one or more of the disadvantages and limitations of prior art arrangements.

Another object of the invention is to provide a polyphase transformer which automatically and without mechanical motion adds all the voltages in a polyphase power transmission system and produces a vector sum on a votlmeter or other measuring instrument.

Another object of the invention is to protect the user of such a measuring device from excessive voltages and currents while measuring a power transmission line for faults.

Another object of the invention is to reduce the cost of fault detector systems and to make such systems portable.

Another object of the invention is to eliminate the third harmonic of the fundamental wave from the measuring instrument, thereby increasing the accuracy of the measuring device by a considerable amount.

The invention comprises broadly an arrangement for combining all the voltage vectors in a polyphase system and for determining their voltage sum which may be measured on a voltmeter. One method of performing this vector addition is by the use of a polyphase transformer in which the primary windings are bridged across pairs of polyphase conductors and in which the secondaries are connected in series with each other and a voltmeter. Another method of arriving at the same result is to place all of the primary windings on a single core with a secondary winding on the same core connected to a voltmeter. In this last arrangement the condition of no leakage fault produces an equally balanced system and no magnetic flux in the core. Because there is no flux in the core each polyphase winding has the same inductance as an air-core coil. Still another means of obtaining the vector sum of all the voltages includes the use of a capacitor connected to each one of the polyphase conductors with the other side of each capacitor connected to a common reference terminal. The voltage between this reference terminal and ground is proportional to the extent of the fault in the system. Measurement means for determining the voltages between the polyphase conductors may include vacuum tubes, transformer windings and transistors.

For a better understanding of the present invention, together with other and further objects thereof, reference is made to the following description taken in connection with the accompanying drawings.

FIG. 1 is a schematic diagram of connections showing a three-phase system with a three-phase transformer coupled between the system and an indicating voltmeter. The voltmeter may be replaced by a circuit breaker or a relay coupled to a circuit breaker.

FIG. 2 is a diagram showing an alternate arrangement of the four primary windings shown in FIG. 1 but supported on a single core with a single secondary winding.

FIG. 3 is a schematic diagram of connections of a test set for a three-phase power transmission system having a neutral return conductor. This system of measurement employs three vacuum tube triodes for the three phases, one vacuum tube for the neutral conductor with its own vacuum tube inverter, and a summation vacuum tube for determining the sum of all the vector voltages and for applying this sum to a voltmeter.

FIG. 4 is a schematic diagram of connections showing how a plurality of capacitors are connected to the conductors of a polyphase system for determining the vector sum of all the voltages between conductors including the neutral return conductor.

FIG. 5 is a diagram of connections similar to that shown in FIG. 4 but employing transistors instead of triode vacuum tubes.

Referring now to FIG. 1, the circuit includes a three-phase generator 10 which may include inductive means 11, 12 and 13 for producing the three-phase voltages and currents transmitted over conductors 14, 15 and 16 to a three-phase load generally designated as 17. In this system of transmission there is a neutral conductor 28 connected to the central point 18 which is grounded. If there is any fault in the system which results in a leakage current to ground, the system will become unbalanced and the vector sum of all the voltages will not be zero. Such a leakage resistance 20 is indicated on the drawing.

In order to measure the unbalanced voltage, three primary windings 21, 22 and 23 are connected in star relationship to a central reference terminal and three secondary windings 24, 25 and 26 are connected in series with each other and their ends connected to an alternating current voltmeter 27 or other utilization device, in such phase relationship that if the system is balanced, and there is no fault between any of the conductors and ground, the resulting voltage shown by voltmeter 27 is zero. If there is a fault and some of the current produced on any of the conductors is returned to the ground reference terminal by means other than conductors 14, 15 and 16 the voltage vectors will not add up to zero and the voltmeter 27 will indicate some value. In FIG. 1 the fault 20 is shown between conductor 16 and ground.

There is always the possibility that, due to iron core saturation, a third harmonic frequency will be generated. While windings 24, 25, and 26 can be connected to balance the fundamental, the third harmonic will be additive and will produce a reading on the meter when there is no fault. In order to eliminate this possibility, an additional primary winding 30 has been added, connected in series between the common reference point 31 and ground. When there is no fault, the vector sum of the fundamental frequencies is zero and there is no potential between points 26A and 24A. However, if there is distortion of the wave and third harmonic exist in any or all of the phases, these components add and can produce a reading on voltmeter 27. Winding 30 has been added to balance the third harmonics and a secondary winding 32 connected in series with windings 24, 25, and 26 can be adjusted to balance the harmonic components and always produce a zero reading on the measuring means 27 when no fault exists. An adjustable resistor 29 connected between winding 30 and ground can be adjusted to give zero reading when no fault exists. Then, when a fault 20 does occur, the voltmeter reading is an accurate and sensitive measure of its extent.

In FIG. 1 the loads 17A, 17B, and 17C are shown connected between the neutral line and the three transmission lines 14, 15, and 16. The loads could be bridged across these lines and they may be equal or differing by considerable amounts. In any case, the vector sum of the voltages across the transmission lines is always zero as long as there is no fault from the lines to ground. The star-connected transformer, having primary windings 21, 22, and 23, produces a core flux proportional to the voltages across the lines and any current drain through a fault, such as resistance 20, alters the voltage balance and produces a reading on the meter.

The transformer shown in FIG. 2 includes a single core 34 plus primary windings 35, 36, 37 and 38. It should be noted that winding 38 is indicated in the drawing in a reversed polarity so that its current, if any, will substract from the other three currents. If this system is balanced there will be no flux produced in core 34 and secondary winding 40 will therefore pick up no voltage for transmission to voltmeter 27. If there is an unbalance, a fault is indicated and meter 27 will give an indication of its value. It is to be understood that the voltmeter 27 may be an alternating current meter but it may also be a circuit breaker having breaker contacts connected in series with all three conductors. This form of the fault detector can be used as a permanent detection means and the value at which the circuit breaker acts to disconnect the load from the generating station may be set at any value desired.

If there is no fault and only the fundamental wave is present, the vector sum of the currents through windings 35, 36, and 37 is zero and there is no current in winding 38. However, if there is a pronounced third harmonic in the transmitted wave (due to core saturation) the harmonic waves are in phase and these currents add, producing a third harmonic flux in the core and a third harmonic current in winding 38. This winding is in a reverse direction so that the flux produced by winding 38 balances the flux produced by the other three windings and the resultant is no flux in the core and no voltage generated in winding 40.

The circuit shown in FIG. 3 is for a three-phase power transmission line having a neutral conductor. Conductors 14, 15 and 16 transmit power from a generating means to a load as indicated in FIG. 1. The neutral conductor 28 has the same connections as indicated in FIG. 2. The circuit shown in FIG. 3 utilizes three vacuum triodes 41, 42 and 43 which are used to sense the voltages existing between conductors 14, 15 and 16 and the control electrodes of each of these three triodes is connected to the power conductors by means of conductors 44, 45 and 46. Each of the control electrodes in these triodes is connected by a high resistance to a reference conductor 47 which is connected to one side of all the cathodes. The neutral conductor 28 is also connected to a triode 48 but, because the neutral voltage must be presented in an inverted manner, an inversion triode 50 is coupled between the conductor 28 and the control electrode of triode 48. The inversion stage must be adjusted to provide unity amplification. Each of these five triodes is supplied with an anode voltage from a power supply 51 which may be a battery, or it may comprise a three-phase transformer with its primary windings connected to the power lines and its secondaries connected to a triple rectifier array 52, well-known in the art. The power supply is connected through respective anode resistors in the usual manner to the anodes. The filament power, or cathode heater power, is supplied by a similar power conversion unit 53.

In order to add all the voltage vectors sensed on the power system, the anodes of each of the four tubes 41, 42, 43, 48, are connected by a series of capacitors 54, 55, 56 and 57. The sum of the sensed voltages is applied to an output triode 60 by means of a conductor 61 which is connected directly to the control electrode of the output tube. The output triode is supplied with the same anode voltage and cathode current as the other triodes mentioned above. Various other leak resistors and coupling capacitors are employed in this circuit for stability, these components and their function being well-known in the art.

The circuit shown in FIG. 3 operates in the same manner as the circuits shown in FIGS. 1 and 2. The voltages which exist between conductors 14, 15, 16 and 28 are sensed by the vacuum triode tubes and the results indicated by the anode-cathode current collected and measured by the voltmeter 27. This circuit has the advantage of very high impedance input from the power conductors and a considerable saving in weight due to the fact that the triodes replace a heavy transformer.

The circuit shown in FIG. 4 includes the same three-phase conductors 14, 15 and 16 plus the neutral conductor 28. The three power conductors are joined to a reference junction terminal 62 by three capacitors 63, 64 and 65. These three capacitors are equal in value and transmit a voltage to terminal 62 which is proportional to the voltages existing on the three power conductors. As indicated in FIG. 4 the junction terminal 62 is connected directly to the control electrode of a triode 66 which is supplied with anode voltage and cathode current by a power supply 67 which may be the same or similar to the power supplies 51 and 53 shown in FIG. 3. In order to combine the voltage existing on the neutral wire 28 to the other three voltages, an inversion triode 68 is employed. Its control electrode is connected directly to neutral conductor 28 by conductor 70 and the anode of triode 68 is connected to the junction terminal 62 by a coupling capacitor 71 which has the same value as capacitors 63, 64 and 65. The inversion triode 68 should have an amplification constant equal to unity and for this reason its control electrode is connected to a variable contact 72 adjustable on a resistor 73 which connects the control electrode of triode 66 and the junction terminal 62 to the negative terminal of the cathode power supply. The alternating current output of triode 66 is connected to voltmeter 27 through a blocking capacitor 74.

The diagram shown in FIG. 5 is the same as that shown in FIG. 4 except that two transistors 75 and 76 are employed instead of the vacuum triodes 66 and 68. The power supply 68 and the recording voltmeter 27 may be the same as that shown in other power supplies and voltmeters except that their output voltage and sensitivity may vary. Transistor 75 is an inversion device and the four capacitors 71, 63, 64 and 65 are all equal to each other and produce the same result as described above.

From the above descriptions it will be obvious that a voltage sensing circuit has been described and illustrated which adds the vector voltage values present in a polyphase system and produces an output voltage equal to the vector sum of all the voltages sensed. An additional inversion circuit compensates for any third harmonics in the system. It should be obvious to those skilled in the art that this same system can be aplied to any other type of polyphase system whether two, four or six phase.

The foregoing disclosure and drawings are merely illustrative of the principles of this invention and are not to be interpreted in a limiting sense. The only limitations are to be determined from the scope of the appended claims.

We claim:

1. A ground fault detector for polyphase transmission systems having a conductor for each phase and a conductor for a systems ground comprising:
  (a) an impedance component connected between each of said conductors and a reference junction terminal,
  (b) coupling means associated with said impedance components for obtaining a voltage which is proportional to the vector sum of the voltages between said conductors and the reference junction terminal,
  (c) a common impedance component connected between said junction terminal and ground for the passage of third harmonic frequencies,
  (d) coupling means associated with said common impedance for subtracting the third harmonic voltage values from said vector sum, and
  (e) means for applying said voltages to an electrical utilization device.

2. A ground fault detector for polyphase transmission systems having a conductor for each phase and a conductor for a systems ground comprising,
  (a) an impedance component connected between each of said conductors and a reference junction terminal, said impedance components being of the same type and of substantially equal impedance values,
  (b) coupling means associated with said impedance components for obtaining a voltage which is proportional to the vector sum of the voltages between said conductors and the reference junction terminal,
  (c) a common impedance component connected between said junction terminal and ground for the passage of third harmonic frequencies,
  (d) coupling means associated with said common impedance for subtracting the third harmonic voltage values from said vector sum, and
  (e) means for applying said voltage to an electrical utilization device.

3. A ground fault detector for polyphase transmission systems having a conductor for each phase and a conductor for a systems ground comprising,
  (a) an impedance component coupled between each of said conductors and a reference junction terminal,
  (b) coupling means associated with said impedance for obtaining a voltage which is proportional to the vector sum of the voltages between said conductors and the reference junction terminal, said coupling means poled so as to add said voltages and produce a zero sum when all the current transmitted flows only through said conductors,
  (c) a common impedance component connected between junction terminal and ground for the passage of third harmonic frequencies,
  (d) coupling means associated with said common impedance for subtracting the third harmonic voltage values from said vector sum, and
  (e) means for applying said sum voltage to an electrical utilization device.

4. A ground fault detector as claimed in claim 3 wherein said impedance components are primary windings on a cored transformer and said coupling means includes at least one secondary winding on the same core.

5. A ground fault detector as claimed in claim 3 wherein said utilization device is an electrical voltmeter.

6. A ground fault detector as claimed in claim 3 wherein said utilization device is a circuit breaker.

7. A ground fault detector as claimed in claim 3, wherein said utilization device is an alarm such as a bell, lamp or relay.

8. A ground fault detector for polyphase transmission systems having a conductor for each phase and a conductor for a neutral conductor comprising,
  (a) an impedance component coupled between each of said phase conductors and a reference junction terminal,
  (b) a similar impedance component coupled between ground and said reference terminal but in a manner to reverse the phase,
  (c) coupling means associated with all of said impedance components for obtaining a voltage which is proportional to the vector sum of the voltages between said conductors and the reference junction terminal, said coupling means poled so as to add said voltages and produce a zero voltage when all the current transmitted flows only through said conductors, and
  (d) means for applying said sum voltage to an electrical utilization device.

9. A ground fault detector as claimed in claim 8 wherein said impedance components are primary windings on a cored transformer and said coupling means includes at least one secondary winding on the same core.

References Cited by the Examiner

UNITED STATES PATENTS

| | | | |
|---|---|---|---|
| 1,308,059 | 7/1919 | Fortesque | 317—18 |
| 1,988,121 | 1/1935 | Hillebrand | 317—18 |
| 2,027,189 | 1/1936 | McLachlan | 317—18 |
| 2,122,107 | 6/1938 | Meller | 317—18 |
| 2,309,487 | 1/1943 | Warrington | 317—18 |
| 2,447,625 | 8/1948 | Astin | 317—18 X |

FOREIGN PATENTS

| | | |
|---|---|---|
| 16,907 | 7/1911 | Great Britain. |
| 555,789 | 3/1923 | France. |
| 420,710 | 10/1925 | Germany. |
| 90,169 | 8/1921 | Switzerland. |
| 145,544 | 6/1931 | Switzerland. |

MILTON O. HIRSHFIELD, *Primary Examiner.*

SAMUEL BERNSTEIN, *Examiner.*

R. V. LUPO, *Assistant Examiner.*